United States Patent [19]

Ogawa

[11] Patent Number: 4,864,710
[45] Date of Patent: Sep. 12, 1989

[54] METHOD AND APPARATUS FOR AUTOMATICALLY LOADING FLEXIBLE TAPE-LIKE RECORDING MEDIUM

[75] Inventor: Masazumi Ogawa, Kanagawa, Japan

[73] Assignee: Fuji Photo Film Co., Ltd., Kanagawa, Japan

[21] Appl. No.: 178,414

[22] Filed: Apr. 6, 1988

[30] Foreign Application Priority Data

Apr. 7, 1987 [JP] Japan .................................. 62-85451

[51] Int. Cl.⁴ ........................ B23P 11/00; B23P 21/00
[52] U.S. Cl. .................................... 29/429; 29/169.5;
29/773; 29/806
[58] Field of Search ...................... 29/169.5, 429, 773,
29/806

[56] References Cited

U.S. PATENT DOCUMENTS

| | | | |
|---|---|---|---|
| 4,035,899 | 7/1977 | Matsuda | 29/773 |
| 4,114,252 | 9/1978 | Kon et al. | 29/806 X |
| 4,330,925 | 5/1982 | Kato et al. | 29/806 X |

Primary Examiner—Howard N. Goldberg
Assistant Examiner—Andrew E. Rawlins
Attorney, Agent, or Firm—Sughrue, Mion, Zinn, Macpeak & Seas

[57] ABSTRACT

On a plurality of continuously supplied reel-recording medium assemblies, each comprising a pair of reels and a recording medium wound around the reels, a series of loop formation steps including steps of drawing the recording medium from the reels by a predetermined length, and shaping the drawn part of the tape into a predetermined loop are performed and the reel-recording medium assemblies are successively loaded into a plurality of continuously supplied casings. The loop formation steps are allotted to a plurality of stations, a plurality of the reel-recording medium assemblies are intermittently conveyed to the stations in sequence, and while the respective assemblies are stopped at the stations, the steps allotted to the respective stations are performed on the corresponding assemblies.

8 Claims, 11 Drawing Sheets

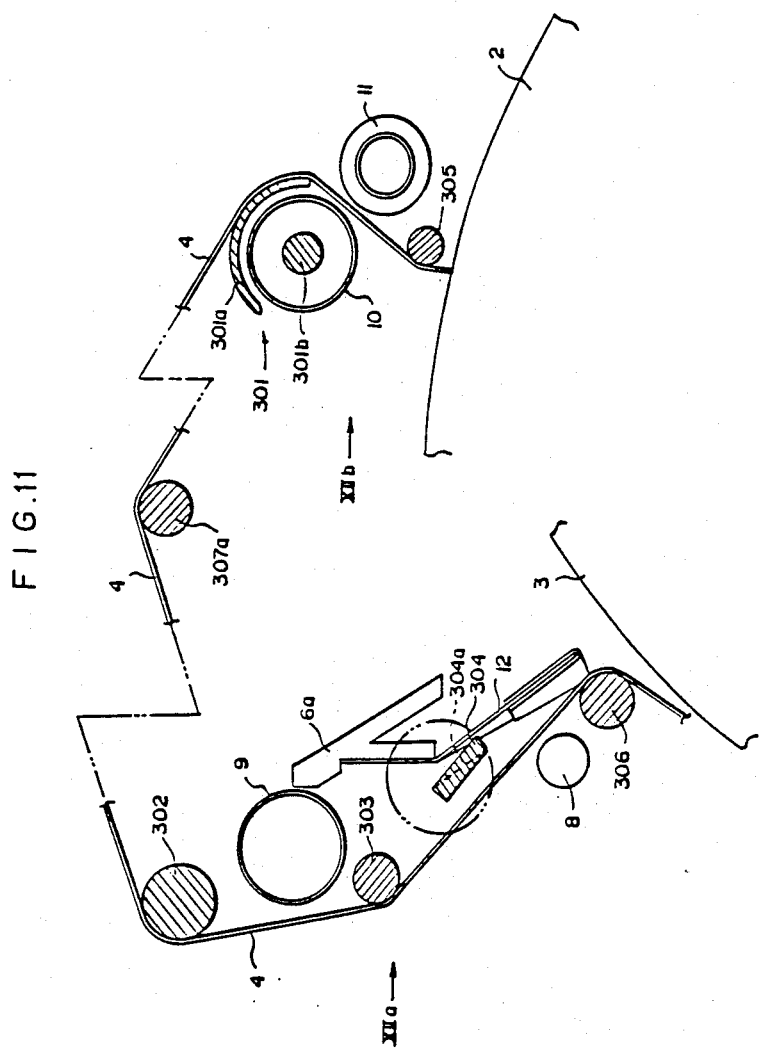

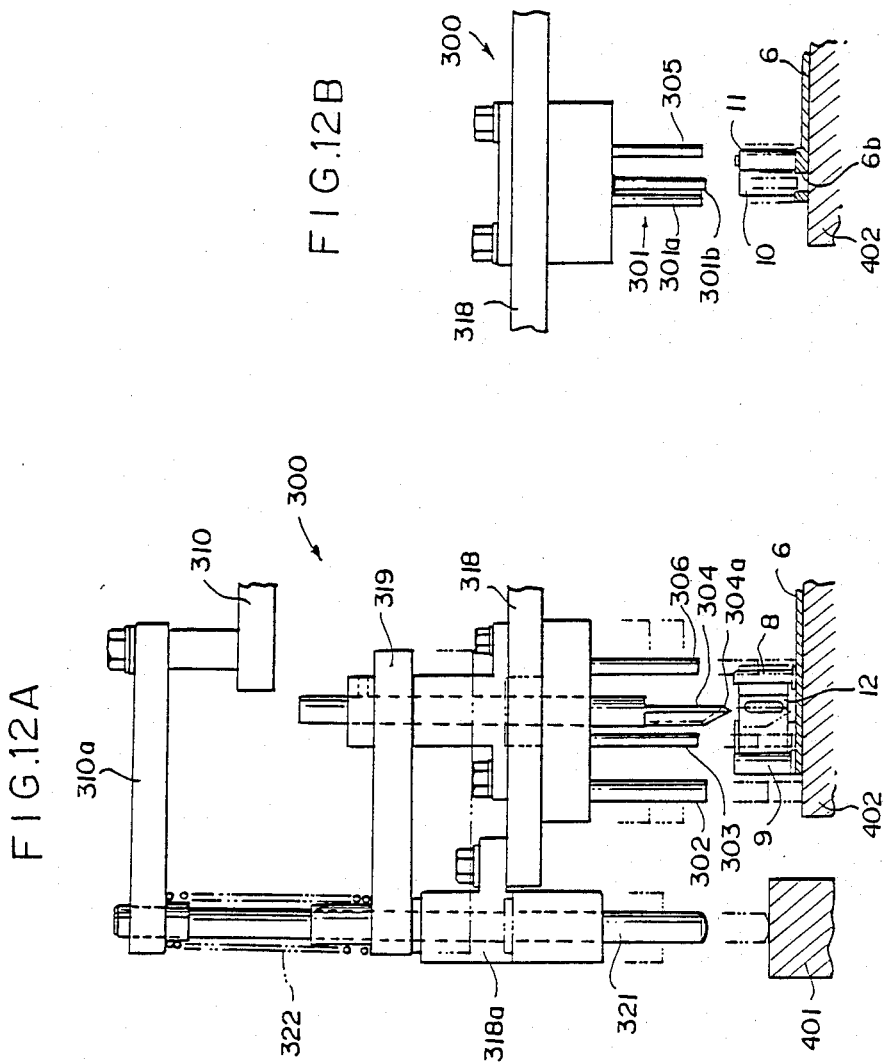

METHOD AND APPARATUS FOR AUTOMATICALLY LOADING FLEXIBLE TAPE-LIKE RECORDING MEDIUM

BACKGROUND OF THE INVENTION

1. Field of the Invention

This invention relates to a method of and an apparatus for automatically loading a flexible tape-like recording medium such as a videotape or an audiotape into a casing.

2. Description of the Prior Art

In a magnetic recording and reproducing system using a flexible tape-like recording medium as a recording medium, the recording medium is run along a predetermined path under the guidance of guide members in the casing upon recording or reproduction. Conventionally the path of the recording medium has been simple in shape as is typical in a so-called Philips type audiotape cassette, and accordingly, loading of the recording medium into the casing has been easy.

However, as the quality of the recording medium has been improved, higher running performance of the recording medium upon recording or reproduction has come to be required. In order to meet such a requirement, there has been developed a tape cassette in which the recording medium is run along a complicated running path such as an S-shaped path in order to better control delivery of the recording medium from a reel, to prevent deviation of the recording medium from the running path and to provide the recording medium with a controlled back tension.

However, when such a complicated running path is employed, loading of the recording medium into the casing becomes difficult and accordingly has been manually effected.

In Japanese Patent Publication No. 60(1985)-19591, there is disclosed a method of and apparatus which enable automatic loading of the recording material into the casing having a complicated running path. In the method and the apparatus, steps of continuously supplying a plurality of reel-tape assemblies, each comprising a pair of reels and a recording tape wound around the reels, with the tape being drawn out from the reels by a predetermined length, shaping the drawn part of the tape into a predetermined loop and loading the reel-tape assemblies into a plurality of casings continuously supplied are automated. In the relevant method and the apparatus, the loop formation step of shaping the drawn part of the tape into a predetermined loop and the loading step of loading the reel-tape assembly into the casing after the loop formation step are performed by a single machine, and the loop formation step and the loading step for one reel-tape assembly are effected after those steps for the preceding reel-tape assembly are completed. Accordingly, the relevant method and apparatus are disadvantageous in that the cycle time cannot be shortened below a certain time. Further, in the relevant method and apparatus, the step of drawing out the tape from the reels is not automated and must be manually accomplished.

SUMMARY OF THE INVENTION

In view of the foregoing observations and description, the primary object of the present invention is to provide a method of and an apparatus for automatically loading a flexible tape-like recording medium into a casing in which all the steps related to the loop formation including the step of drawing out the recording medium from the reels can be automated, and in which the cycle time can be substantially shortened.

The method of the present invention is characterized in that a series of loop formation steps to be performed for one reel-recording medium assembly are performed in sequence at a plurality of stations and the steps allotted to the respective stations are performed for a plurality of reel-recording medium assemblies in parallel. The apparatus of the present invention is characterized in that the loop formation means for performing a series of loop formation steps is provided with a plurality of reel-recording medium assembly holding sections and an intermittent driving means for intermittently conveying the holding sections to a plurality of stations in sequence, and a plurality of the assemblies held by the respective reel-recording medium assembly holding sections are conveyed to stations in sequence by the intermittent driving means, and while the respective assemblies are stopped at the stations, the steps allotted to the respective stations are performed on the corresponding assemblies.

That is, in accordance with one aspect of the present invention, there is provided a method of automatically loading a flexible tape-like recording medium into a casing in which, on a plurality of continuously supplied reel-recording medium assemblies, each comprising a pair of reels and a recording medium wound around the reels, a series of loop formation steps including steps of drawing the recording medium from the reels by a predetermined length, and shaping the drawn part of the tape into a predetermined loop are performed and the reel-recording medium assemblies are successively loaded into a plurality of continuously supplied casings characterized in that said loop formation steps are allotted to a plurality of stations, a plurality of the reel-recording medium assemblies are intermittently conveyed to the station in sequence, and while the respective assemblies are stopped at the stations, the steps allotted to the respective stations are performed on the corresponding assemblies.

In accordance with another aspect of the present invention, there is provided an apparatus for automatically loading a flexible tape-like recording medium into a casing comprising an assembly supply means for continuously supplying a plurality of reel-recording medium assemblies, each comprising a pair of reels and a recording medium wound around the reels, a loop formation means which performs, on each of the assemblies supplied by the assembly supply means, a series of loop formation steps including steps of drawing the recording medium from the reels by a predetermined length, and shaping the drawn part of the tape into a predetermined loop, a casing supply means which continuously supplies a plurality of said casings, and a loading means for successively loading the reel-recording medium assemblies after formation of the loop into the casings characterized in that said loop formation means is provided with a plurality of reel-recording medium assembly holding sections for holding the reel-recording medium assembly and an intermittent driving means which cyclically conveys the holding sections to a plurality of stations, and a plurality of reel-recording medium assemblies held by the respective reel-recording medium assembly holding sections are conveyed to the stations in sequence by the intermittent driving means, and while the respective assemblies are stopped at the stations, the steps allotted to the respective stations are performed on the corresponding assemblies.

The term "flexible tape-like recording medium" denotes, for example, a magnetic tape including an audiotape, a videotape and a data tape, and a cinefilm.

The term "predetermined loop" denotes a shape of the drawn part of the recording medium which permits the part of the recording medium to conform to the running path of the recording medium in the casing.

Said "continuous supply of the assemblies" may be performed in any manner so long as supply of the assemblies is in synchronization with the intermittent conveyance of the assemblies. For example, the means for supplying the assemblies and the means for intermittently conveying the assemblies may be integrated with each other.

BRIEF DESCRIPTION OF THE DRAWINGS

FIG. 11 is a fragmentary plan view as viewed in the direction of arrow XI in FIG. 1, and FIGS. 12A and 12B are side views as viewed in the direction of arrows XIIa and XIIb in FIG. 11.

DESCRIPTION OF THE PREFERRED EMBODIMENT

Figure 1:
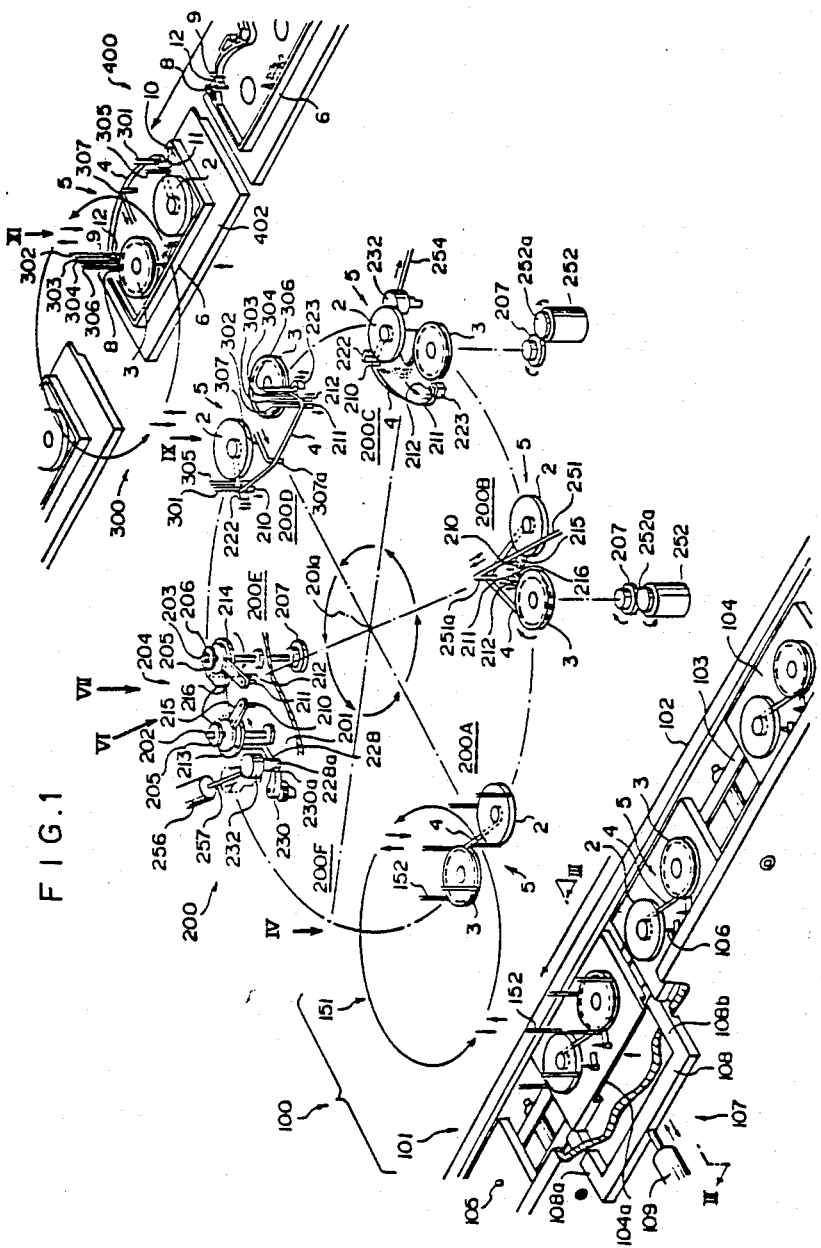
FIG. 1 is a schematic perspective view of an apparatus in accordance with an embodiment of the present invention.
Figure 2:
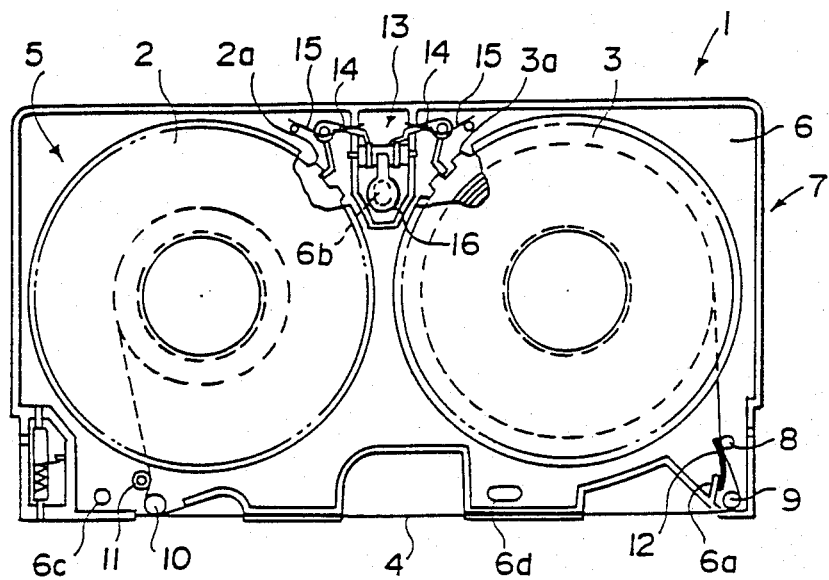
FIG. 2 is a plan view showing a videotape cassette to be assembled by use of the apparatus shown in FIG. 1.

An apparatus in accordance with an embodiment of the present invention shown in FIG. 1 is for automatically loading a video tape into a videotape cassette 1 for a home video system shown in FIG. 2.

The videotape cassette 1 comprises a reel-tape assembly 5 including a pair of reels 2 and 3 and a videotape 4 wound around the reels 2 and 3. The reel-tape assembly 5 is loaded in a casing 7 formed of an upper half (not shown) and a lower half 6. The reel 2 functions as a take-up reel and the reel 3 functions as a supply reel. That is, during recording or reproduction, the take-up reel 2 is driven and the videotape 4 is taken up around the take up reel 2 after running along a predetermined running path. The running path is defined by first and second guide pin 8 and 9 in front of the supply reel 3 and a third guide pin 10 and a guide roller 11 in front of the take-up reel 2. As can be seen from FIG. 2, the running path is complicated in shape and includes an S-shaped portion defined by the first and second guide pins 8 and 9, and another S-shaped portion defined by the third guide pin 10 and the guide roller 11. A resilient piece 12 supported by a rib 6a on the lower casing half 6 at one end thereof abuts against the first guide pin 8 under its own resiliency, and the videotape 4 is sandwiched between the resilient piece 12 and the first guide pin 8. By virtue of the S-shaped portion of the running path defined by the first and second guide pins 8 and 9 and the resilient piece 12, delivery of the videotape 4 from the supply reel 3 can be controlled in an optimal manner and deviation of the videotape 4 from the running path can be suppressed, and by virtue of the S-shaped portion of the running path defined by the third guide pin 10 and the guide roller 11, the videotape 4 can be provided with a controlled back tension when it is taken up around the take-up reel 2.

In order to prevent the reels 2 and 3 from unnecessarily rotating to slacken the videotape 4, a locking mechanism 13 for locking the reels 2 and 3 when the videotape cassette 1 is not used is provided behind the reels 2 and 3. The locking mechanism 13 comprises a pair of levers 14 adapted to be engaged with teeth 2a and 3a formed on the peripheries of the respective reels 2 and 3, a pair of springs 15 for urging the levers 14 to abut respectively against the reels 2 and 3, and a release lever 16 which is rotated by a pin inserted into the casing 7 through a hole 6b formed in the lower casing half 6. The release lever 16 disengages the levers 14 from the teeth 2a and 3a when it is rotated. When the levers 14 are in engagement with the teeth 2a and 3a, rotation of the reels 2 and 3 in the direction in which the videotape 4 is slackened is prevented while rotation of the same in the reverse direction is permitted.

In FIG. 1, the apparatus of this embodiment comprises a reel-tape assembly supply system 100 for continuously supplying reel-tape assemblies 5 (each including a pair of reels 2 and 3 and a tape 4 a described above), a loop formation system 200 which unwinds a part of the video tape 4 from each of the reel-tape assemblies 5 supplied by the reel-tape assembly supply system 100 and shapes the part of the tape 4 into a predetermined loop, a casing supply system 400 for continuously supplying lower casing halves 6, and a loading system 300 for loading into each of the lower casing halves 6 one of the reel-tape assemblies 5 the tapes of which have been shaped into a loop.

The reel-tape assembly supply system 100 comprises a conveyor 101 for conveying reel-tape assemblies 5 produced by a tape winding machine (not shown), and a transfer means 151 for transferring the reel-tape assemblies 5 to the loop formation system 200.

Figure 3:
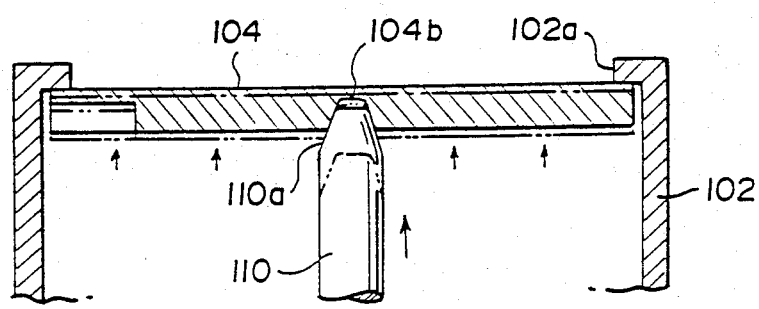
FIG. 3 is a cross-sectional view taken along line III—III in FIG. 1.

The conveyor 101 comprises a pair of belts 103 running along a guide rail 102 linearly extending from the tape winding machine via the transfer means 151, and a pair of pallets 104 mounted on the belts 102. Each reel-tape assembly 5 is placed on the pallet 104 in a predetermined position and is conveyed to the transfer means 151. Each pallet 104 is provided with a pair of locator pins 105 which holds the reels 2 and 3 spaced from each other by a distance equal to the distance by which the reels 2 and 3 are spaced in the videotape cassette 1, and a pair of lock members 106 which are substantially the same in function as the levers 14 of the locking mechanism 13 of the cassette 1 and prevent rotation of the reels 2 and 3. Each pallet 104 is conveyed along the guide rail 102 and stopped in a predetermined position by a stopper mechanism 107. The stopper mechanism 107 comprises an arm 108 having a pair of stop pieces 108a and 108b spaced from each other in a direction parallel to the pallet conveying direction, and an actuator 109 which horizontally moves back and forth the arm 108 in a direction perpendicular to the pallet conveying direction between an operative position and a retracted position. In the operative position of the arm 108, the downstream side stop piece 108a stops the leading pallet 104 in a predetermined position with respect to the transfer means 151, and the upstream side stop piece 108b stops the next pallet 104 to wait there. A cutaway portion 104a is formed in the side of each pallet 104 facing the arm 108 in order to prevent the side stop pieces 108a and 108b from interfering with the respective downstream side pallets 104 when the arm 108 is moved to the operative position. The arm 108 together with the stop pieces 108a and 108b is intermittently moved back and forth at regular intervals by the actuator 109, and in synchronization with the movement of the arm 108, a pair of ejector pins 110 (FIG. 3) move upward from below the pallet 104 stopped by the downstream side stop piece 108a to eject upward the pallet 104. The ejector pins 110 are spaced from each other in the pallet conveying direction and have tapered upper end portions 110a. The ejector pins 110 are moved upward with the respective tapered upper end portions 110a engaged with tapered holes 104b formed on the lower surface pf the pallet 104 until the upper surface of the pallet 104 abuts against flange portions 102a formed on opposite sides of the guide rail 102, whereby the pallet 104 is positioned in all the directions, back and forth, right and left, and up and down.

The transfer means 151 lifts the reel-tape assembly 5 by engaging three each engagement pieces 152 with the reels 2 and 3, and rotates by 180° in a horizontal plane to deliver the reel-tape assembly 5 to a holding section (to be described later) of the loop formation system 200 at a first station 200A with the assembly 5 remaining in the state when it is lifted.

Figure 4:
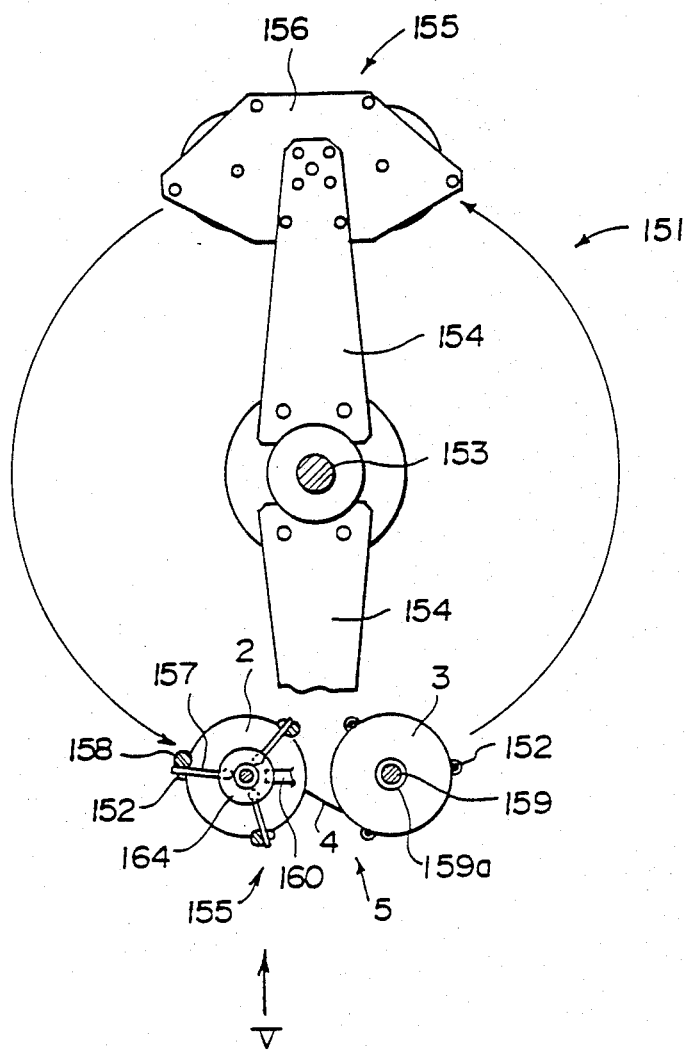
FIG. 4 is a plan view as viewed in the direction of arrow IV in FIG. 1.
Figure 5:
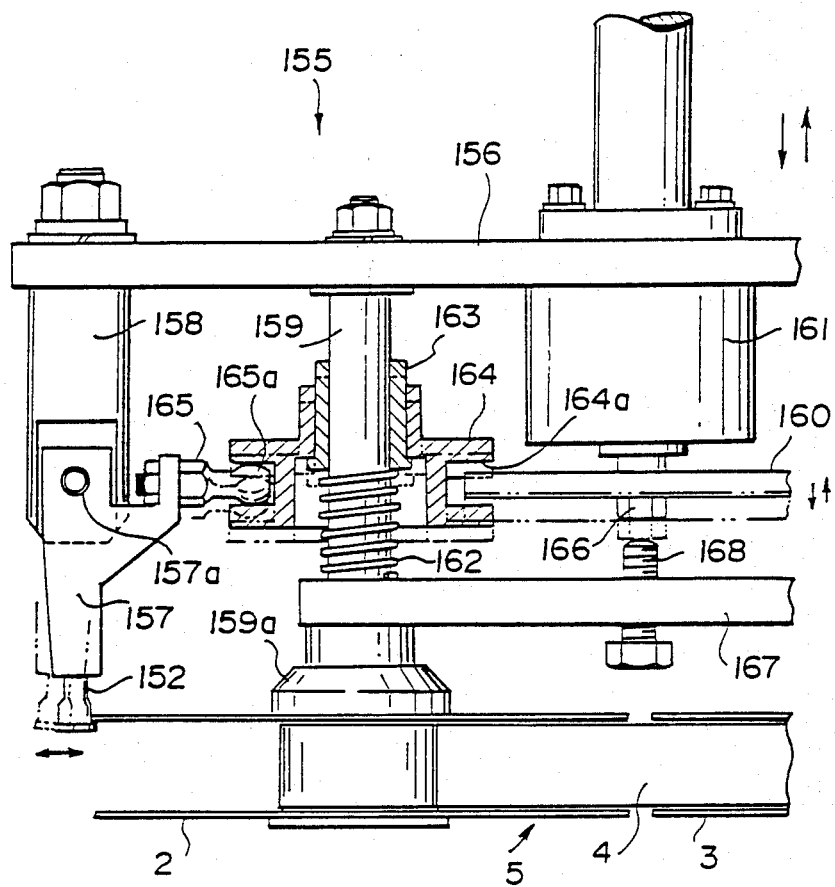
FIG. 5 is a side view as viewed in the direction of arrow V in FIG. 4.

As shown in FIGS. 4 and 5, the transfer means 151 comprises a rotary shaft 153 which is movable up and down, a pair of arms 154 extending from the rotary shaft 153 in opposite directions, and engagement mechanisms 155 provided on the respective arms 154 at the free ends thereof. Each engagement mechanism 155 has six said engagement pieces 152 with a first three of them being arranged to circumscribe the reel 2 angularly spaced from each other by 120° and the other three being arranged to circumscribed the reel 3 angularly spaced from each other by 120°. A support plate 156 is fixed to each of the arms 154, and six support pins 158 for pivotally supporting levers 157, to which the engagement pieces 152 are fixed, are fixed to the support plate 156. Each of the levers 157 is pivoted on the support pin 158 by a pin 157a. Further a pair of abutment pins 159 are fixed to the support plate 156 spaced from each other by a distance equal to the center-to-center distance of the reels 2 and 3 of the reel-tape assembly 5 to be transferred. Each abutment pin 159 has an abutment portion 159a at the lower end thereof, the abutment portion 159a having a horizontal abutment face which is adapted to be brought into contact with the upper surface of the reels 2 or 3. Further, to the support plate 156 is fixed an actuator 161 for moving up and down a control plate 160 which controls the engagement pieces 152. A sleeve 163 is slidably fitted on the abutment pin 159 and is urged upward by a coil spring 162. A ring 164 having an annular groove 164a formed on the outer peripheral surface thereof is fixed to the sleeve 163. A bolt 165 having a spherical head 165a is fixed to each of the levers 157 and the spherical head 165 of each bolt 165 is fitted into the annular groove 164a. Further an end portion of the control plate 160 is inserted into the annular groove 164a. The control plate 160 is fixed by a bolt 166 and the control plate 160 is movable downward until the bolt 166 abuts against an adjustment bolt 168 which is screwed into a transverse plate 167 connecting the pair of abutment pins 159. When the actuator 161 moves upward the control plate 160, the ring 164 having the annular groove 164a is moved upward under the force of the spring 162. This causes the levers 157 to rotate inward toward the edge of the reels 2 and 3 by way of the engagement of the spherical heads 165a of the bolts 165 with the annular groove 164a of the ring 164, whereby the engagement pieces 152 carried by the levers 157 are brought into engagement with the reel 2 and 3.

When the pallet 104 is positioned as described above, the support plate 156 is moved downward toward the pallet 104 with the engagement pieces 152 being opened. When the abutment portions 159a of the abutment pins 159 respectively abut against the upper surfaces of the reels 2 and 3, actuator 161 moves upward the control plate 160 to close the engagement pins 152 or to bring the engagement pins 152 into engagement with the edge of the corresponding reels 2 and 3 in the manner described above. Then the support plate 156 is moved upward and rotated by 180° to be brought above the first station 200A of the loop formation system 200. Thereafter, the support plate 156 is moved downward and the actuator 161 moves downward the control plate 160, thereby opening the engagement pieces 152 to release the reels 2 and 3. With the engagement pieces 152 kept open, the support plate 156 is moved upward and is brought above the pallet 104 positioned next.

As shown in FIG. 1, the loop formation system 200 includes an index table 201 and an intermittent driving means (not shown) which intermittently rotates the index table 201 by 60° about the rotational axis 201a. Six holding sections 204 are provided on the index table 201 arranged in a circle having its center on the rotational axis 201a of the index table 201 at intervals of 60°. Each holding section 204 is provided with a pair of support pins 202 and 203 and the center-to-center distance therebetween is equal to the center-to-center distance between the reels 2 and 3 as they are loaded in the casing 7. The middle between the support pins 202 and 203 of each holding section 204 is positioned at one of first to six stations 200A to 200 shown by the chain line in FIG. 1 every time the index table 201 is stopped.

At the first station 200A, the reel-tape assembly 5 is delivered to the holding section 204 stopped at the first station 200A by the transfer means 151. Each of the support pins 202 and 203 is integrally provided with a holding plate 205 for holding the assembly 5 in the state when it is delivered to the holding section 204. Further, the support pin 203 for holding the supply reel 3 is integrally provided with a rotation preventing piece 206. Thus, the assembly 5 is horizontally held without slackening the tape 4. The support pin 203 for the supply reel 3 is mounted for rotation on the index table 201 and can be rotated by rotating a gear 207 fixed to the lower end portion thereof.

The assembly 5 delivered to the holding section 204 at the first station 200A is successively brought to the second to sixth stations 200B to 200F. At the second station 200B, a part of the tape 4 is drawn out, at the third station 200C, the part of the tape 4 drawn out at the second station 200B is shaped into a loop, and at the fourth station 200D, the assembly 5 is delivered to the loading system 300.

At the second station 200B, a part of the tape 4 is drawn out by a drawing lever 251 which is slidable back and forth in the direction inclined rightward at 20° to the radial direction of the index table 201. That is, the drawing lever 251 is moved inward by an actuator (not shown) provided at the second station 200B, and pushes inward the tape 4 at a vertical portion 251a thereof to draw out the tape 4 from the reels 2 and 3 by a predetermined length. Since the tape 4 is wound around the take-up reel 2 by only several turns, the tape 4 is drawn out mainly from the supply reel 3. The drawing lever 251 is controlled by a cm (not shown) to be slowed down after abutting against the tape 4 so that the tape 4 is not subjected to an impact which can deteriorate the quality of the tape 4. The gear 207 on the lower end portion of the support pin 203 for supporting the supply reel 3 is brought into engagement with a brake shaft 252a of a hysteresis brake 252 to provide a predetermined braking torque against rotation of the supply reel 3 while the tape 4 is drawn out from the reel 3. That is, by applying a predetermined voltage to the hysteresis brake 252, an appropriate back tension is applied to the tape 4 while the tape 4 is drawn out, thereby preventing the tape 4 from being excessively drawn out from the reel 3.

After the drawing lever 251 is moved forth trailing the tape 4 and before the lever 251 is retracted, first to third loop formation pins 210 to 212 are projected upward. These loop formation pins 210 to 212 are supported by the support pins 202 and 203. That is, support disks 213 and 214 are respectively supported for rotation on the support pins 202 and 203, and one ends of arms 215 and 216 are respectively fixed to the support disks 213 and 214. The first loop formation pin 210 is retractably mounted on the arm 215 near the other end thereof, and the second and third loop formation pins 211 and 212 are retractably mounted on the arm 216 near the other end thereof. That is, when the drawing lever 251 is moved forth trailing the tape 4, the loop formation pins 210 to 212 are retracted not to interfere with the tape 4. After the loop formation pins 210 to 212 are projected upward, the drawing lever 251 is moved back. In order to prevent interference with the loop formation pins 210 to 212 when the drawing lever 251 is moved backward, tne drawing lever 251 is inclined at 20° to the radial direction of the index table 201 as described above.

Figure 6:
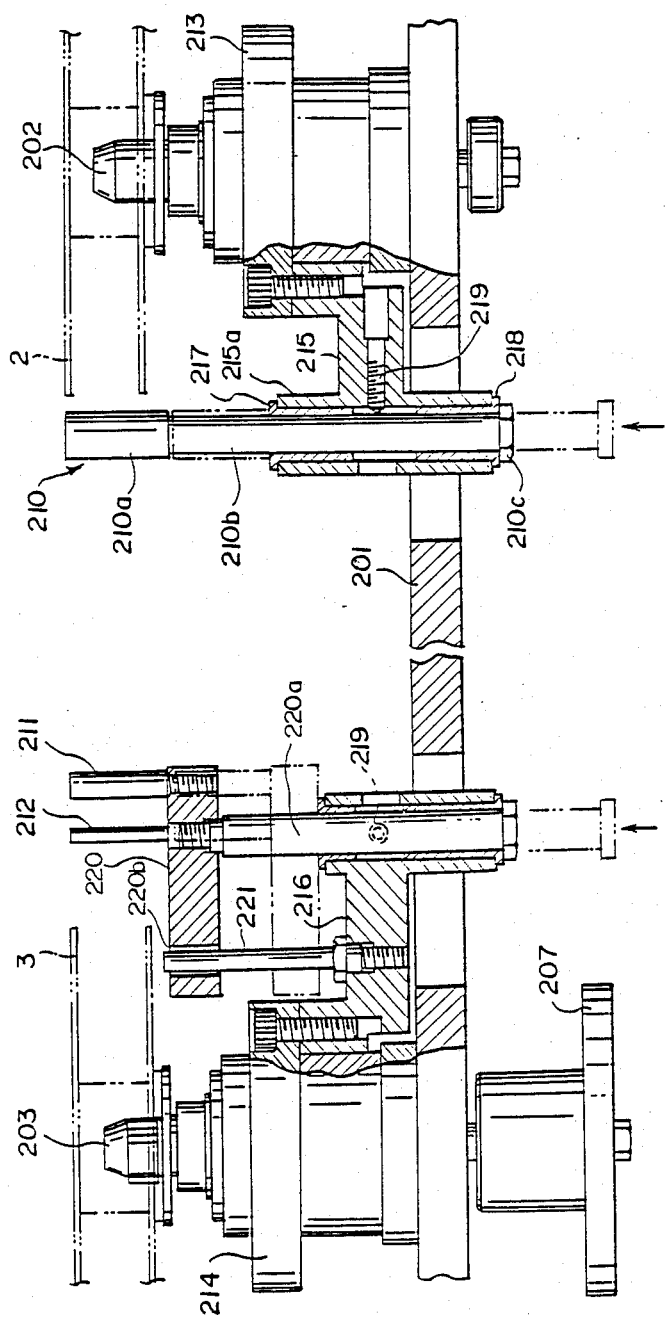
FIG. 6 is a side view as viewed in the direction of arrow VI in FIG. 1.

As clearly shown in FIG. 6, the first loop formation pin 210 comprises a head portion 210a, a shank portion 210b and a base portion 210c, and the shank portion 210b is slidably fitted into a vertical cylindrical portion 215a on the arm 215 by way of upper and lower sleeves 217 and 218. The first loop formation pin 210 is movable upward until the base portion 210c abuts against the lower sleeve 218 and movable downward until the head portion 210a abuts against the upper sleeve 217. A ball plunger 219 having a ball resiliently supported on the tip thereof is screwed into the arm 215 to be moved back and forth in perpendicular to the shank portion 210b of the first loop formation pin 210. The ball on the tip of the ball plunger 219 is pressed against the shank portion 210b of the first loop formation pin 210 at a portion between the upper and lower sleeves 217 and 218. The position of the ball plunger 219 is selected with respect to the pin 210 so that the pin 210 is kept stationary until vertical load larger than a predetermined value acts on the pin 210.

The second and third loop formation pins 211 and 212 are mounted on the arm 216 in the similar manner. However, since the second and third loop formation pins 211 and 212 are smaller in diameter than the first loop formation pin 210, a sub-arm 220 is provided and the second and third loop formation pins 211 and 212 are projected upward and retraced downward by way of the sub-arm 220. That is, the pins 211 and 212 are fixed to the sub-arm 220, and the sub-arm 220 is fixed to a vertical pin 220a which is mounted on the arm 216 and held by a ball plunger 219 in the manner similar to the first loop formation pin 210. The sub-arm 220 is provided with a bore 220b through which extends a rotation preventing pin 221 to permit vertical movement of the sub-arm 220 but to prevent rotation of the sub-arm 220. Tne rotation preventing pin 221 is fixed to the arm 216 at its lower end.

Then, the reel-tape assembly 5 from which the tape 4 has been drawn by a predetermined length is transferred to the third station 200C, and the part of the tape is shaped into a predetermined shape which conforms to the running path of the tape 4 in the casing 7 (loop formation). That is, at the third station 200C, the first loop formation pin 210 and the second and third loop formation pins 211 and 212 are moved right and left away from each other to press the tape 4 against a pair f L-shaped pins 222 and 223 which are respectively provided near the reels 2 and 3.

Figure 7:
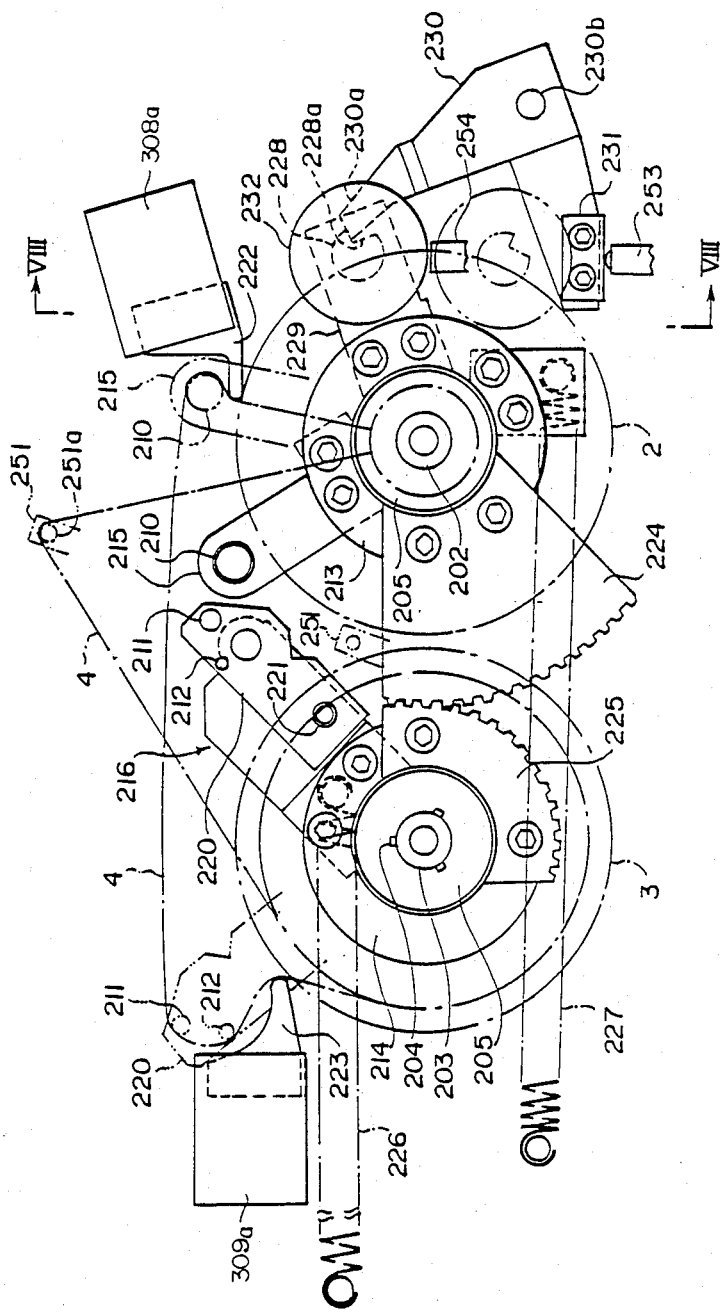
FIG. 7 is a plan view as viewed in the direction of arrow VII in FIG. 1.

Now referring to FIG. 7, the loop formation will be described in more detail. As shown in FIG. 7, a large sector gear 224 and a small sector gear 225 are respectively fixed to said support disks 213 and 214 on the support pins 202 and 203, and are in mesh with each other. The support disk 213 for the take-up reel 2 is clockwisely urged by a coil spring 227 and the support disk 214 for the supply reel 3 is counterclockwisely urged by a coil spring 226. A post-like engagement member 228 having a cutaway portion 228a is fixed to the support disk 213 by way of an arm 229. An engaging end 230a of an L-shaped lever 230 is in engagement with the cutaway portion 228a of the engagement member 228. With this arrangement, the support disk 213 is held in the position shown in FIG. 7 though it is clockwisely urged by the spring 227. Also the support disk 214 is held in the position shown in FIG. 7 by virtue of mesh of the sector gears 224 and 225 though it is counterclockwisely urged b the spring 226. The L-shaped lever 230 is rotatable about a shaft 230b and is counterclockwisely urged by a suitable means (not shown). An abutment block 231 formed of hard material is fixed to the end of the lever 230 opposite to the engaging end 230a.

The loop formation is performed by causing a release rod 253 to abut against the abutment block 231 to permit clockwise rotation of the L-shaped lever 230, thereby disengaging the engaging end 230a of the lever 230 from the cutaway portion 228 of the engagement member 228. This permits the support disk 213 for the take-up reel 2 to rotate in the clockwise direction under the force of the coil spring 227, and permits the support disk 214 for the supply reel 3 connected to the support disk 213 by way of the sector gears 224 and 225 to rotate in the counterclockwise direction, whereby the arms 215 and 216 respectively fixed to the support disks 213 and 214 are rotated to bring the loop formation pins 210, 211 and 212 supported thereon to the position shown by the chain line in FIG. 7. The coil spring 226 for urging the support disk 214 serves to prevent rattling due to backlash between the sector gears 224 and 225 though it is not essential for the operation described above. The difference in diameter between the sector gears 224 and 225 corresponds to the difference between the angle by which the arm 215 is to be rotated and the angle by which the arm 216 is to be rotated.

By the loop formation described above, the part of the tape 4 drawn from the reels 2 and 3 are shaped into a shape having an S-shaped portion defined by the first loop formation pin 210 and the L-shaped pin 222, and another S-shaped portion defined by the second and third loop formation pins 211 and 212 and the L-shaped pin 223. A braking rod 254 is frictionally engaged with a cylindrical member 232 fixed to the engagement member 228 to prevent the arms 215 and 216 from abruptly rotating under the force of the coil spring 227 and 226, thereby preventing the tape 4 from being subjected to an excessive force.

Figure 8:
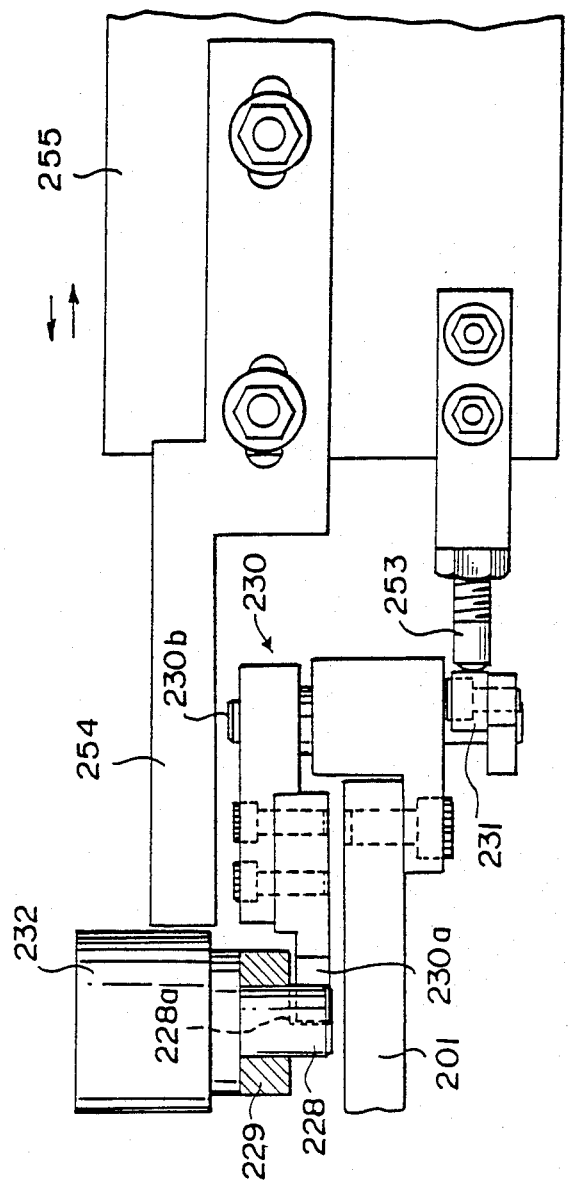
FIG. 8 is a cross-sectional view taken along line VIII—VIII in FIG. 7.

That is, as shown in FIG. 8, the release rod 253 and the braking rod 254 are fixed to the reciprocating member 255 which is moved back and forth by a driving means (not shown) disposed at the third station 200C. The reciprocating member 255 is gently moved back under the control of a cam (not shown). The positions of the rods 253 and 254 on the reciprocating member 255 are selected so that when the release rod 253 abuts against the abutment block 231, the braking rod 254 is slightly short of the cylindrical member 232. That is, when the release rod 253 is further moved forth, the L-shaped lever 230 is rotated and the engaging end 230a of the L-shaped lever 230 is disengaged from the cutaway portion 228a of the engagement member 228, and immediately after the engaging end 230a is disengaged from the cutaway portion 228a, the braking rod 254 is brought into contact with the cylindrical member 232. Accordingly, by subsequently gently moving the reciprocating member 255, the cylindrical member 232 and accordingly, the arms 215 and 216 are gently rotated by virtue of the braking rod 254.

After formation of the loop, the assembly 5 is transferred to the fourth station 200D and is delivered to the loading system 300 at the fourth station 200D. The loading system 300 has six loading pins 301 to 306, and at the fourth station 200D, the loading pins 301 to 306 are moved downward to press down the loop formations pins 210, 211 and 212 by the loading pins 301, 302 and 303, and to press down the L-shaped pins 222 and 223 by the loading pins 305 and 306. In this manner, the tape 4 is transferred to the loading pins 301 to 306 while the shape of loop formed in the third station 200C is maintained. (The function of the loading pin 304 will become apparent later.) Thereafter, a predetermined tension is applied to the tape 4 by a tension lever 307. That the application of tension to the tape 4 is effected after the tape 4 is transferred to the loading pins 301 to 306 is because transfer of the tape 4 to the loading pins 301 to 306 can be effected more easily without interference of the loading pins with the tape 4 when the tape 4 is somewhat slackened.

Figure 9:
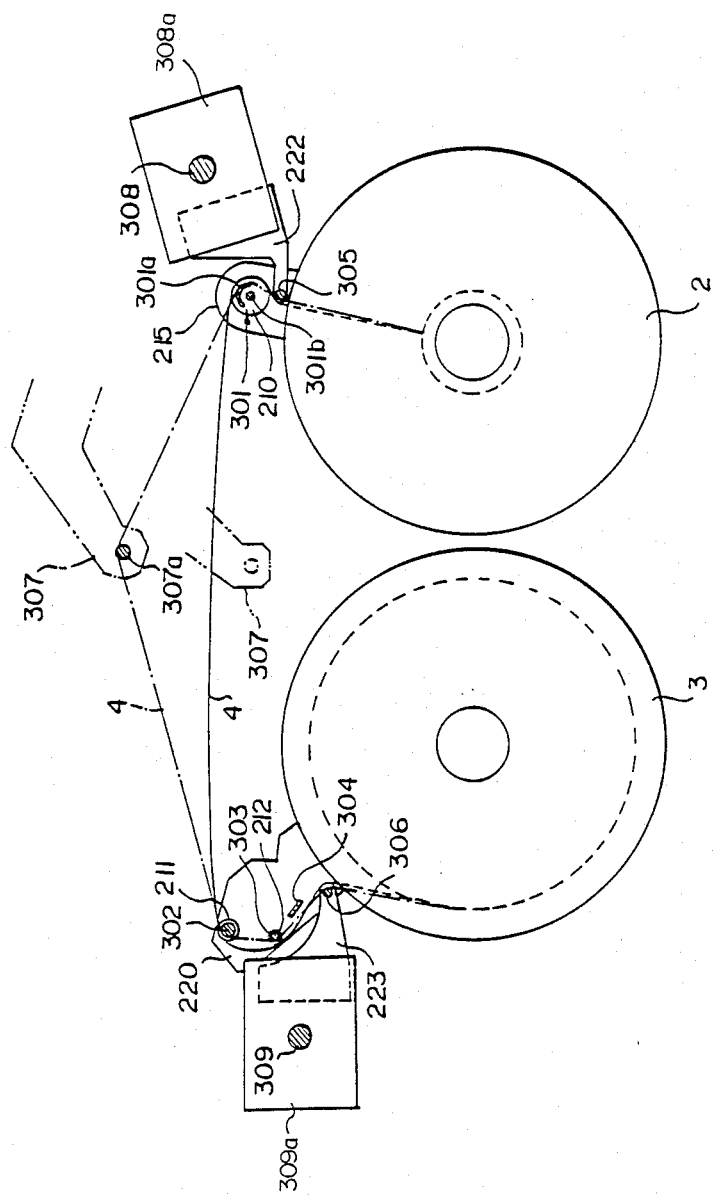
FIG. 9 is a plan view as viewed in the direction of arrow IX in FIG. 1.

As shown in detail in FIG. 9, the loading pins 302 and 303 are slightly smaller in diameter than the loop formation pins 211 and 212, and the loading pins 305 and 306 are slightly smaller in diameter than the upper ends of the L-shaped pins 222 and 223. The loading pin 301 comprises an arcuate pin portion 301a and a central pin portion 301b, and the arcuate pin portion 301a is slightly smaller in diameter than the loop formation pin 210. This is for preventing the tape 4 from interfering with the loading pins 301 to 303, 305 and 306 when the tape 4 is transferred.

The loop formation pins 210 to 212 are moved downward, pushed by the loading pins 301 to 302, and remain in the lowered position after the loading pins 301 to 303 are subsequently lifted by virtue of the plunger pins 219 as described above in conjunction with FIG. 6. On the other hand, the L-shaped pins 222 and 223 are moved downward, pushed by the loading pins 305 and 306, and are moved upward as the loading pins 305 and 306 are lifted. Pressure plates 308a and 309a respectively fixed to pins 308 and 309 which are moved up and down together with the loading pins 305 and 306 are provided to abut against the L-shaped pins 222 and 223 to assist the loading pins 305 and 306 in pressing down the L-shaped pins 222 and 223.

After the tape 4 is transferred to the loading pins 301 to 306, the tension lever 307 is rotated to apply a predetermined tension to the tape 4. The rotating angle of the tension lever 307 is selected so that a suitable tension which can hold the tape 4 on the loading pins 301 to 306 while the loading system 300 lifts the assembly 5 and loads it into the lower casing half 6 and which cannot adversely affect the quality of the tape 4 is applied to the tape 4. The rotating angle of the tension lever 307 is determined taking into account the length of tape 4 by which the tape 4 is drawn from the reels 2 and 3 by the drawing lever 251 at the second station 200B and the loop formation pins 210 to 212 at the third station 200C.

The loading system 300 is substantially the same in structure as the transfer means 151 shown in FIGS. 4 and 5 except that the loading pins 301 to 306, the tension lever 307 and the pins 308 and 309 are added.

Figure 10:
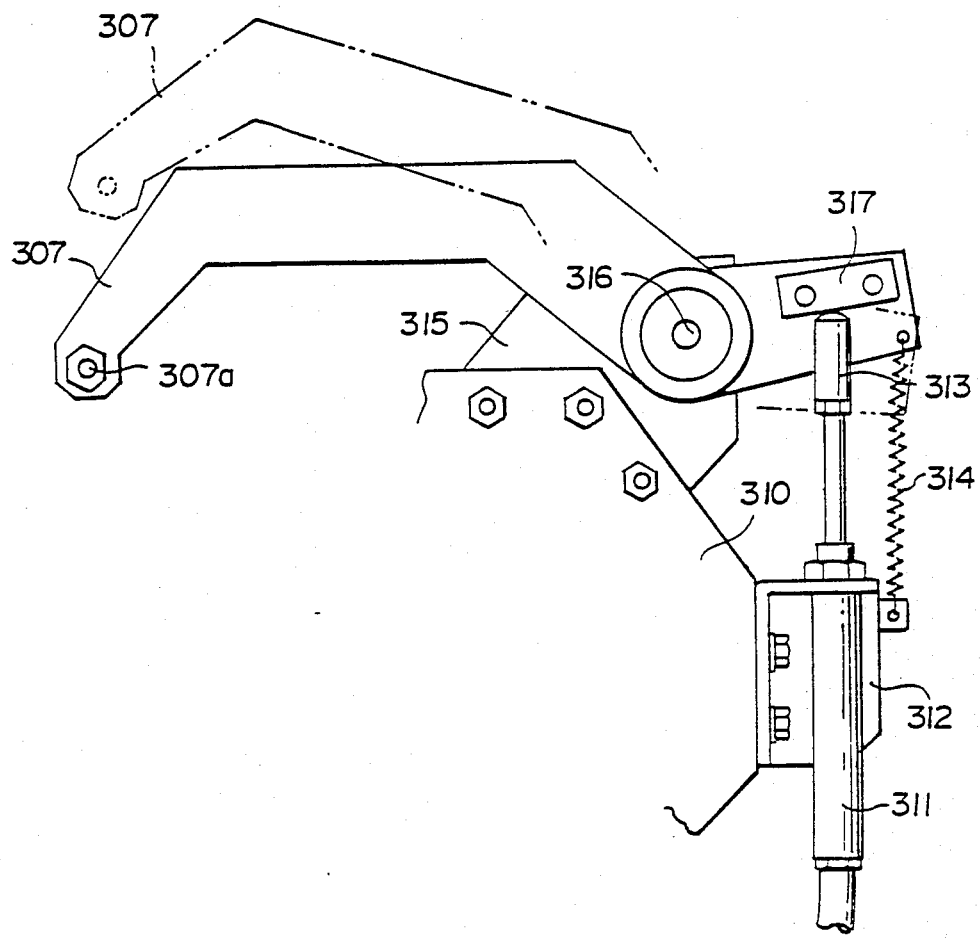
FIG. 10 is a plan view showing a mechanism for rotating the tension lever.

As shown in FIG. 10, the loading system 300 is provided with a support plate 310 equivalent to the support plate 156 of the transfer means 151, and an actuator 311 is fixed to the support plate 310 by way of a bracket 312. A control rod 313 is moved back by the actuator 311 overcoming the force of a coil spring 314. The tension lever 307 is supported by the support plate 310 by way of an extension plate 315 for rotation about a shaft 316. The tension lever 307 has a vertical pin 307a at one end, and an abutment block 317 formed of hard material is fixed to the other end of the tension lever 307. The tension lever 307 is clockwisely urged by a suitable means (not shown) and the control rod 313 is normally in abutment with the abutment block 317. Thus, the tension lever 307 is rotated by a predetermined angle in response to retraction of the control rod 313 to apply a tension to the tape 4.

As shown in FIG. 1, at the fourth station 200D, the assembly 5 is lifted by the loading system 300 and is loaded into the lower casing half 6 which is supplied and positioned by the casing supply system 400. The lower casing half 6 has a pair of locator holes 6c and 6d as shown in FIG. 2 and is positioned with respect to a pallet 402 by bringing a pair of locator pins (not shown) on the pallet 402 into engagement with the locator holes 6c and 6d. A plurality of the lower casing halves 6 are successively supplied by the casing supply system each on one pallet 402. The mechanism for supplying and positioning the pallets 402 is substantially the same as that of the conveyor 101 of the reel-tape assembly supply system 100.

When the loading pins 301 to 306 are moved downward to the lowermost position, the tension lever 307 is retracted to slacken the tape 4 thereby releasing the tape 4 from the loading pins 301 to 306. Thereafter, the loading pins 301 to 306 are lifted and the loading operation is completed. The lower casing half 6 loaded with the assembly 5 is conveyed to the next manufacturing step together with the pallet 402 by the casing supply system 400.

FIG. 11 shows the position of the loading pins 301 to 306 with respect to the first to third guide pins 8 to 10 and the guide roller 11 on the lower casing half 6 when the assembly 5 is loaded into the lower casing half 6 by the loading system 300.

Near the take-up reel 2, the tape 4 is passed substantially centrally between the third guide pin 10 and the guide roller 11 so as not to interference with the loading pins 301 and 305. Near the supply reel 3, the tape 4 is passed between the first and second guide pins 8 and 9 so as not to interference with the loading pins 302 and 303. The loading pin 301 is formed of the arcuate pin portion 301a and the central pin portion 301b for the following purpose. That is, the arcuate pin portion 301a is for inserting the tape 4 into the narrow space between the third guide pin 10 and the guide roller 11 without interference with the third guide pin 10 in a limited space. The central pin portion 301b is for pressing the first loop formation pin 210 when transferring the tape 4 from the loop formation pins to the loading pins since it is impossible for the arcuate pin portion 301a to press down the loop formation pin in view of its strength. On the other hand, though there is a sufficient space between the first and second guide pins 8 and 9, the resilient piece 12 is in abutment with the first guide pin 8 (FIG. 2), and accordingly, the resilient piece 12 must be removed away from the first guide pin 8 when the tape 4 is inserted. This is done by the loading pin 304. That is, the resilient piece 12 is in the form of a resilient plate which is fixed at one end to the rib 6a on the lower casing half 6 and extends vertical like a cantilever. The loading pin 304 is provided with an inclined surface 304a formed on the lower end portion thereof. When the loading pin 304 is moved downward, the inclined surface 304a abuts against the resilient piece 12 to twist the resilient piece 12, thereby removing the resilient piece away from the first guide pin 8.

As shown in FIG. 12A, the loading pins 302 to 304 and 306 are supported on a loading pin support plate 318 fixed to the support plate 310. The loading pins 302, 303 and 306 are fixed to the loading pin support plate 318 while the loading pin 304 is slidably fitted in the loading pin support plate 318 and is fixed to a movable plate 319. A stopper pin 321 is fixed to the movable plate 319 to extend in parallel to the loading pin 304. The stopper pin 321 is slidably fit in a bushing 318a fixed to the loading pin support plate 318, and a coil spring 322 is provided between the movable plate 319 and a spring retainer plate 310a.

Further, as shown in FIG. 12B, also the loading pins 301 and 305 are fixed to the loading pin support plate 318. As can be seen from FIG. 12B, the central pin portion 301b projects downward from the arcuate pin 301a so that the central pin portion 301b abuts against the loop formation pin 210 when the loading pin 301 is moved downward to press down the loop formation pin 210 as described above, thereby protecting the arcuate pin portion 301a.

As can be seen from FIGS. 12A and 12B, the arcuate pin portion 301a of the loading pin 301 and the loading pins 303, 305 and 206 are equal to each other in length, and the central pin portion 301b of the loading pin 301 is slightly longer than these pins. Further, the loading pin 302 is slightly longer than the central pin portion 301b, and the loading pin 304 is longer than the loading pin 302.

When the support plate 310 and the loading pin support plate 318 are moved downward, the loading pins 301 to 306 and the stopper pin 321 are moved downward together. When the stopper pin 321 abuts against a stopper block 401, the stopper pin 321 and the loading pin 304 fixed to the movable plate 319 is stopped there, and the other pins 301 to 303, 305 and 306 are further moved downward. That is, the movable plate 319 is moved upward relative to the support plate 310 and the loading pin support plate 318 when the load acting thereon exceeds a predetermined value.

The loading pin 304 projects downward more than the other loading pins as described above, and accordingly, the inclined surface 304a on the lower end portion of the loading pin 304 first abuts against the resilient piece 12 to deform it away from the first guide pin 8, thereby permitting the tape 4 held by the loading pins 302, 303 and 306 to be inserted between the resilient piece 12 and the first guide pin 8. By arranging so that the loading pins 304 is movable upward relative to the other loading pins as described above, interference of the loading pin 304 with the lower casing half 6 when the other loading pins are moved downward to the lowermost position can be prevented.

The lowermost position of the loading pins has been determined in advance by the device (not shown) for moving up and down the support plate 310, and in the lowermost position, the arcuate pin portion 301a of the loading pin 301 and the loading pins 303, 305 and 306 are positioned very close to the lower casing half 6. In the lowermost position, the central pin portion 301b of the loading pin 301 is inserted into the hole 6b formed in the lower casing half 6 and accordingly does not interfere with the casing half 6.

After the assembly 5 is thus loaded into the casing half 6, the holding section 204 is prepared at the fifth station 200E for the next loop formation. That is, a pushing rod 257 is provided at the fifth station 200E to be moved back and forth by an actuator 256. The pushing rod 257 is moved toward the cylindrical member 232 of the holding section 204 stopped at the fifth station 200E to abut against the cylindrical member 232 and to turn it about the support pin 202, thereby moving the arms 215 and 216 toward each other. When the cylindrical member 232 is rotated by a predetermined angle, the cutaway portion 228a of the engagement member 228 is brought into engagement with the engaging end 230a of the L-shaped lever 230.

The holding section 204 just passes through the sixth section 200F.

The operations in the apparatus described above, that is, supply of the assembly 5 by the conveyor 101 and the transfer means 151 of the reel-tape assembly supply system 100, loop formation at the stations 200A to 200E of the loop formation system 200, loading by the loading system 300 and supply of the casing by the casing supply system 400 are effected in synchronization with intermittent rotation of the index table 201. For example, these operations are effected under the driving force transmitted by a timing belt (not shown) connected to the intermittent driving means for the index table 201.

Further, these operations are simultaneously effected on all the assemblies 5 at the respective stages. Accordingly, the time required to load one assembly 5 into the lower casing half 6 and to deliver the next manufacturing step is substantially equal to the period of intermittent rotation of the index table 201. Thus in accordance with the embodiment described above, production efficiency of the videotape cassette is substantially improved, and the manufacturing steps from supply of the reel-tape assembly 5 to delivery of the lower casing half 6 loaded with the reel-tape assembly 5 can be completely automated.

In the embodiment described above, the tape 4 is gently drawn by the drawing lever 251 at the second station 200B while applying an appropriate back tension to the tape 4 by the hysteresis brake 252 in order to prevent the tape 4 from being subjected to an impact which can deteriorate the quality of the tape 4 and to prevent the tape 4 from being excessively drawn out. This may be done by use of a pulse motor. That is, the tape 4 may be unrolled by a predetermined length from the supply reel 3 by providing a pulse motor instead of the hysteresis brake 252 in the structure shown in FIG. 1 and energizing the pulse motor to rotate the gear 207 by a predetermined angle.

Since the diameter of the tape roll wound around the supply reel 3 is substantially constant, the length of the tape to be drawn from the supply reel 3 can be determined by the number of pulses to be given to the pulse motor. In the case that the tape 4 is drawn out by the drawing lever 251, the tape should be drawn at a speed lower than a predetermined value so as not to apply an excessive tension to the tape 4. On the other hand, in the case that the tape 4 is unrolled by use of the pulse motor, the predetermined length of the tape 4 can be instantly unrolled. However, in order to bring the unrolled tape over the loop formation pins 210 to 212, a guide lever similar to the drawing lever 251 in shape must be employed. By use of the pulse motor in order to unroll the tape 4, the time required to draw out the tape 4 at the second station can be shortened. Since the time required to draw out the tape 4 is the longest, shortening of the time required to draw out the tape leads to shortening of the time for which the index table must be stopped and accordingly to shortening of the cycle time of the apparatus.

I claim:

1. A method of automatically loading a flexible tape-like recording medium into a casing comprising the steps of:

continuously supplying reel-recording medium assemblies, each of said reel-recording medium assemblies including a pair of reels and a recording medium wound around the reels;

performing a series of loop formation steps, each of said steps being allotted to one of a plurality of stations; said series of loop formation steps including steps of:

drawing a predetermined length of said recording medium from said reels, and shaping said predetermined length of said recording medium into a loop of predetermined shape;

continuously supplying a plurality of casings;

successively loading said reel-recording medium assemblies into said plurality of casings in such a manner that said predetermined shape of said loop of each of said reel-recording medium assemblies is maintained in said casings;

intermittently conveying each of said plurality of reel-recording medium assemblies to said plurality of stations sequentially;

wherein said allotted loop formation steps are performed at said plurality of stations when respective ones of said plurality of reel-recording assemblies are stopped at said plurality of stations.

2. An apparatus for automatically loading a flexible tape-like recording medium into a casing comprising:

an assembly supply means for continuously supplying a plurality of reel-recording medium assemblies, each comprising a pair of reels and a recording medium wound around the reels;

a loop formation means which performs, on each of the assemblies supplied by the assembly means, a series of loop formation steps including drawing the recording medium from the reels by a predetermined length, and shaping the drawn part of the tape into a loop of predetermined shape;

a casing supply means which continuously supplies a plurality of said casings; and a loading means for successively loading the reel-recording medium assemblies after formation of said loop into the casings so that said predetermined shape of said loop is maintained in said casing, wherein said loop formation means has a plurality of reel-recording medium assembly holding sections for holding multiple reel-recording medium assemblies and an intermittent driving means which cyclically conveys the holding sections to a plurality of stations, so that each reel-recording medium assembly held by a respective one of said plurality of reel-recording medium assembly holding sections is conveyed to said stations in sequence by the intermittent driving means, and while the respective assemblies are stopped at the stations, the steps allotted to the respective stations are performed on the corresponding assemblies.

3. An apparatus as defined in claim 2 in which said loop formation means has a drawing lever for drawing out the recording medium from at least one of said reels, and a braking means which brakes the reel from which the recording medium is drawn to limit rotation of the reel.

4. An apapratus as defined in claim 2, wherein said loop formation means comprises a circular table with said plurality of reel-recording medium assembly holding sections disposed at 60° intervals around said circular table, said circular table being driven by said intermittent driving means so that said table is conveyed cyclically thus moving each of said plurality of reel-recording medium assembly holding sections to each of said plurality of stations, wherein said plurality of stations comprise:

a station for receiving one of said reel-recording medium assemblies;

a station for drawing said tape-like recording medium out from one of said multiple reel-recording medium assemblies;

a loop forming station;

a transfer station for allowing said loading means to load one of said reel-recording medium assemblies into one of said casings; and a resetting station for resetting said loop formation means.

5. An apparatus as defined in claim 2, wherein said assembly supply means further comprises:

means for conveying said reel-recording medium assemblies; and means for transferring said reel-recording medium assemblies from said means for conveying to said loop formation means.

6. An apparatus as defined in claim 5, wherein said transfer means comprises:

engagement means comprising six engagement members, wherein a first set of three of said engagement members is arranged to circumscribe a first one of said pair of reels, said first set of three engagement members being spaced angularly from each other by 120°, and wherein a second set of three engagement members is arranged to circumscribe the other one of said pair of reels, said second set of three engagement members being spaced angularly form each other by 120°; and actuator means for raising and lowering said engagement means.

7. An apparatus as defined in claim 4, wherein said loop formation means further comprises:

a guide lever disposed at said drawing station, said guide lever being movable back and forth in a direction inclined 20° relative to the radial direction of said table, said guide lever having a vertical portion for drawing out said tape-like recording medium from said pair of reels as said guide lever is moved toward said table, and formation pins for forming said loop when said guide lever has drawn said tape-like recording medium from said reels.

8. An apparatus for automatically loading a flexible tape-like recording medium into a casing comprising an assembly supply means for continuously supplying a plurality of reel-recording medium assemblies, each comprising a pair of reels and a recording medium wound around the reels, a loop formation means which performs, on each of the assemblies supplied by the assembly supply means, a series of loop foramtion steps including drawing the recording medium from the reels by a predetermined length, and shaping the drawn part of the tape into a loop of predetermined shape, a casing supply means which continuously supplies a plurality of said casings, and a loading means for successively loading the reel-recording medium assemblies after formation of the loop into the casings characterized in that said loop formation means is provided with a plurality of reel-recording medium assembly holding sections for holding the reel-recording medium assembly and an intermittent driving means which cyclically conveys the holding sections to a plurality of stations, and a plurality of reel-recording medium assemblies held by the respective reel-recording medium assembly holding sections are conveyed to the stations in sequence by the intermittent driving means, and while the respective assemblies are stopped at the stations, the steps allotted to the respective stations are performed on the corresponding assemblies, in which said loop formation means has a driving means for rotating the reels by a predetermined angle to unwind the recording medium by a predetermined length, and a guide lever for guiding the unwound part of the recording medium in a predetermined direction.

* * * * *